C. B. CULBERTSON.
REVERSIBLE PLOW.
APPLICATION FILED APR. 11, 1921.

1,427,677.

Patented Aug. 29, 1922.
3 SHEETS—SHEET 1.

Charles B. Culbertson
INVENTOR.

BY
Hazard & Miller
ATTORNEYS

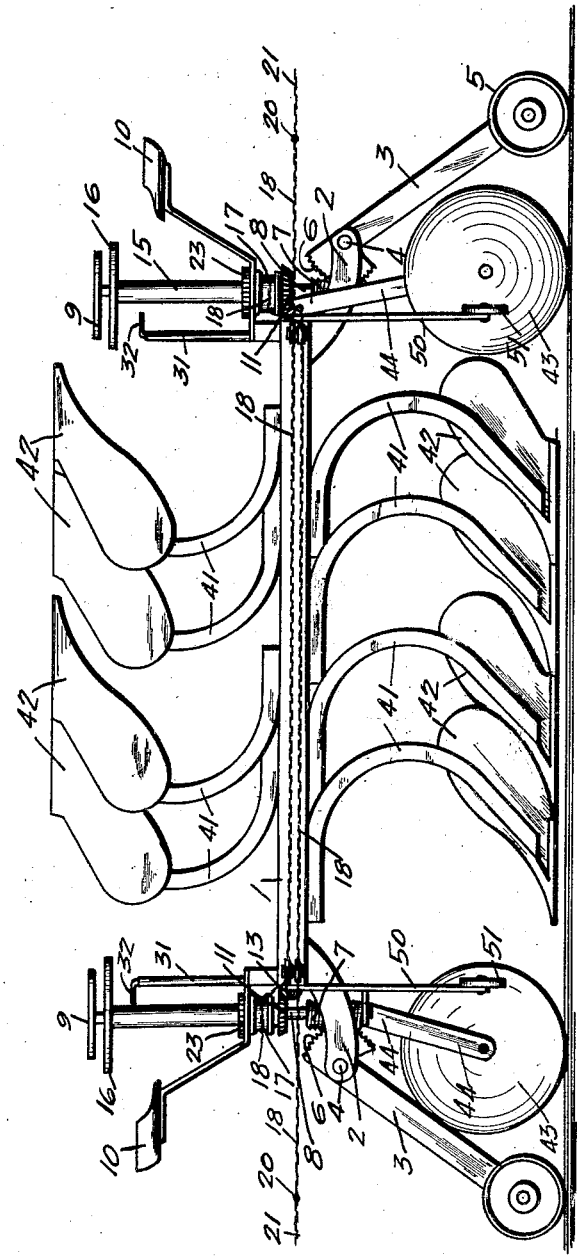

C. B. CULBERTSON.
REVERSIBLE PLOW.
APPLICATION FILED APR. 11, 1921.
1,427,677.
Patented Aug. 29, 1922.
3 SHEETS—SHEET 3.
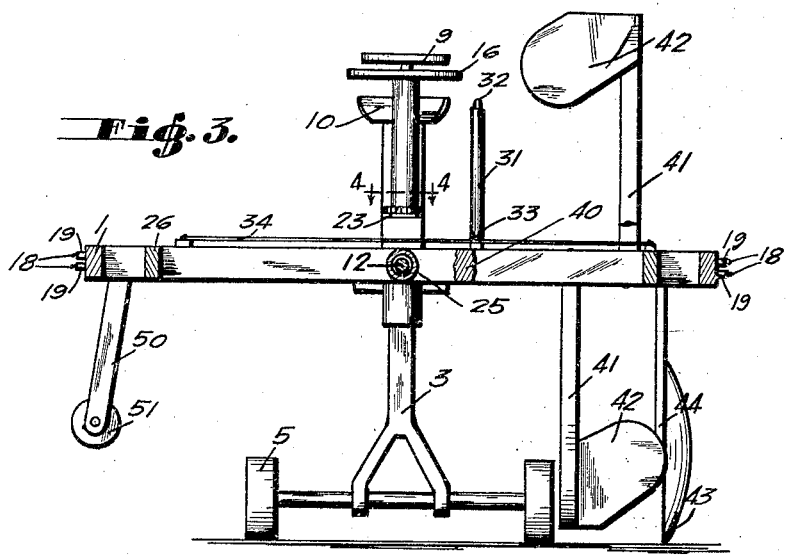
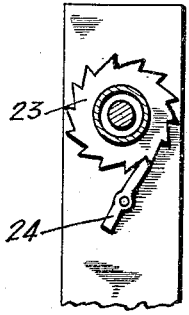
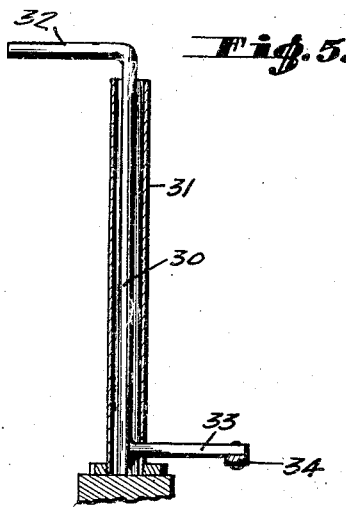
Charles B. Culbertson
INVENTOR.
BY
Hazard & Miller
ATTORNEYS

UNITED STATES PATENT OFFICE.

CHARLES B. CULBERTSON, OF PASADENA, CALIFORNIA.

REVERSIBLE PLOW.

1,427,677.  Specification of Letters Patent.  Patented Aug. 29, 1922.

Application filed April 11, 1921. Serial No. 460,300.

*To all whom it may concern:*

Be it known that I, CHARLES B. CULBERTSON, a citizen of the United States, residing at Pasadena, in the county of Los Angeles and State of California, have invented new and useful Improvements in Reversible Plows, of which the following is a specification.

It is the object of this invention to provide a plow arranged for reverse plowing across a field without necessitating the turning around of the vehicle frame carrying the plow, since the plow itself is pivotally mounted in the vehicle frame so as to present plow shares extending in opposite directions to the ground when the vehicle frame of the plow is moved back and forth across a field.

The invention provides improved means for guiding the plow structure in its movement back and forth and for adjusting the plow shares with relation to the ground as well as practical and simplified means for locking the pivotally mounted plow structure with either of the respective plow shares which extend in opposite directions in engagement with the ground.

The invention will be readily understood from the following description of the accompanying drawings, in which Figure 1 is a plan view of a plow constructed in accordance with the invention.

Figure 2 is a side elevation of the same partly broken away.

Figure 3 is a transverse section on the line 3—3 of Fig. 1.

Figure 4 is a detail section on the line 4—4 of Fig. 3.

Figure 5 is a detail section on the line 5—5 of Fig. 1.

Figure 1:
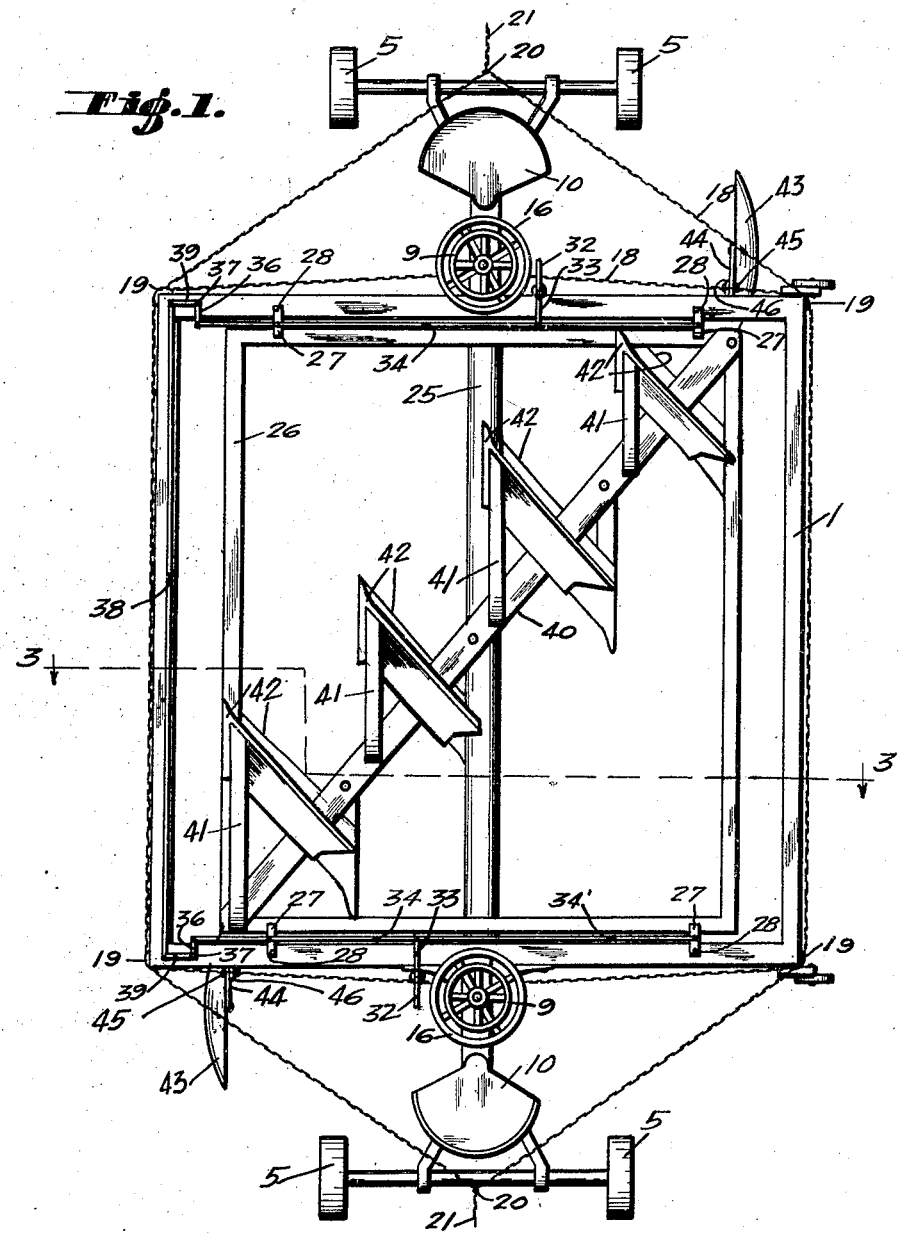

The improved plow comprises a vehicle frame shown as a rectangular frame 1 which carries the pivotally mounted frame supporting the plow shares extending in opposite directions.

The ends of the frame 1 are provided with projecting brackets 2, and supports 3 are pivoted therein as shown at 4 with ground engaging wheels 5 journaled at the lower ends of the supports.

The supports 3 are adapted to be dependently swung upon their pivots so as to raise and lower the frame 1 with relation to the ground. For this purpose arcuate gears 6 are provided upon the upper ends of supports 3, and said arcuate gears mesh with worm gears 7 carried by upwardly extending shafts 8 arranged in suitable bearings upon frame 1 and terminating in hand wheels 9 for rotating said shafts. An operator's seat 10 is positioned adjacent each of the shafts 8 at the respective ends of the plow frame, and when the plow is moving in reverse directions, the operator occupies one or the other of seats 10 and elevates the plow through the adjacent hand wheel 9. In order that rotation of either hand wheel 9 will turn both shafts 8, bevel gears 11 are fixed upon the respective shafts 8, and a longitudinally extending shaft 12 journaled in frame 1 is provided with bevel gears 13 at its respective ends meshing with the respective bevel gears 11.

The steering of the plow mechanism is accomplished by mounting a column 15 upon the respective shafts 8 and providing the same with hand wheels 16 below hand wheels 9. Drums 17 are provided upon the respective columns 15, and a flexible steering member, such as a cable 18, is received around each of drums 17 with the ends of said cables then passing around pulleys 19 carried by frame 1 so as to project beyond the opposite end of frame 1 at the respective sides thereof and terminate in a connection 20 secured to a suitable draft appliance 21.

It will thus be seen that with the operator's seat at one end of the plow and the draft beyond the opposite end of the plow, that by turning the adjacent hand wheel 16 the operator may shift the flexible cable 18 to which the draft is connected, so that the draft connection 21 will be at one side or the other of the longitudinal medial line of the plow in order to cause turning of the plow as desired.

Means are preferably provided for locking the respective columns 15 and their drums 17 in adjusted positions, said means being shown as ratchet wheels 23 upon respective columns 15 with pawls 24 pivoted to the plow frame engaging said ratchet wheels.

The pivotally mounted plow structure mounted in frame 1 includes a shaft 25 journaled at the longitudinal medial line of the plow frame and received over shaft 12. The shaft 25 carries a rectangular frame 26 disposed within frame 1 and adapted to be secured in horizontal alinement with frame 1 with either side of frame 26 turned downwardly. For this purpose latching members 27 are pivoted to frame 1 as shown at 28 with their latching ends adapted to overlie frame 26 at the respective sides of its axis so as to lock the frame 26 against pivotal movement.

The latching members 27 may be simultaneously swung out of alinement with frame 26 from either end of the plow so as to permit of pivotal movement of the plow structure. For this purpose an operating rod 30 is journaled in a bearing 31 adjacent the respective operator's seats 10, said operating rods being provided with operating handles 32. The operating rods carry laterally extending arms 33 connected to links 34 extending along the ends of frame 1 and pivotally connected to the latches 27 at one end of frame 1, so as to swing the same into locking or unlocking position through turning of rods 30. The link 34 at each end of frame 1 is also arranged to actuate the link 34 at the opposite end of said frame, and for this purpose links 34 are each connected to arms 36 of bell crank levers pivoted at 37 to frame 1, with a link 38 extending the length of frame 1 and pivotally connected at its respective ends to the other arms 39 of the bell crank levers.

The plow shares extending in opposite directions and projecting from opposite sides of frame 26 so that one or the other of the sets of plow shares will engage the ground, depending upon which side of frame 26 is turned downwardly, are shown as supported by diagonal member 40 carried by frame 26 with a plurality of plow beams 41 projecting from member 40 at the opposite sides of frame 26. Usual plow shares 42 are carried by beams 41, and as previously stated, the beams and plow shares at the respective sides of frame 26 extend in opposite directions so as to provide a gang plow structure operative when moving in reverse directions, by swinging frame 26 upon its pivot so as to engage the ground by one set or the other of the plows.

Usual furrow wheels 43 are preferably provided for the plow and are arranged at opposite ends of the respective sides of frame 1. These furrow wheels may be adjustably supported by mounting the same upon arms 44 pivoted as shown at 45 to brackets 46 projecting from the end cross pieces of frame 1.

The plow is preferably drawn back and forth across a field by connecting draft appliances to suitable cables extending across the field and wound upon drums positioned at the end of the field and actuated by suitable donkey engines. A suitable crane may be positioned adjacent each donkey engine, and when the plow has been moved across the field to one of the donkey engines and where it is desired to revolve plow frame 26 so that the plow may be moved in the opposite direction, the retaining members 27 are first disengaged and a suitable cable passing over the frame is connected to the side of frame 26, so that by operating the donkey engine, the plow frame 26 may be swung upon its horizontal pivot so as to reverse frame 26. In order to prevent tilting of frame 1 during this operation, supports 50 preferably depend from the side of frame 1 which is opposite the side of frame 26 engaged by the cable passing over the crane. Wheels 51 may be mounted upon the end of these supports and the supports are of such length as to be normally out of engagement with the ground, but in such position as to engage the ground as soon as there is a tendency of frame 1 to tilt laterally when frame 26 is reversed.

Various changes may be made without departing from the spirit of the invention as claimed.

What is claimed is:

1. A reversible plow comprising a rectangular main frame, a rectangular secondary frame fitting in the main frame, a longitudinal shaft mounted in the main frame and extending through the secondary frame at its center and forming a pivot for the secondary frame, a diagonal member mounted in the secondary frame, plow shares mounted upon the diagonal member and extending in opposite directions, and means for raising the main frame to raise the plow shares so that they can be reversed.

2. The combination with a frame, of a plow structure pivoted therein and having plow shares extending in opposite directions upon opposite sides of said plow structure, supporting arms for said frame carrying traction wheels and pivotally connected to said frame, and means for swinging said arms upon their pivots to raise and lower said frame with relation to the ground.

3. The combination with a frame, of a plow structure pivoted therein and having plow shares extending in opposite directions upon opposite sides of said plow structure, a draft connection at each end of the frame, flexible connection extending from each draft connection to the opposite ends of the frame, a drum at each end of the frame having the respective flexible connections oppositely wound thereon, and steering means for rotating said drums to laterally shift the draft connections at the opposite ends of the frame, in order to steer said plow from either end of the plow frame.

4. The combination with a frame, of a plow structure pivoted therein and having plow shares extending in opposite directions upon opposite sides of said plow structure, a draft connection at each end of the plow, and means for shifting either draft connection from the opposite end of the plow frame in order to steer the plow.

In testimony whereof I have signed my name to this specification.

CHAS. B. CULBERTSON.